United States Patent
Manzanares (10) Patent No.: US 8,817,803 B2
(45) Date of Patent: Aug. 26, 2014

(54) METHOD AND HIERARCHICAL RADIO NETWORK OPERATIONS SYSTEM FOR CONTROLLING A MOBILE COMMUNICATIONS NETWORK

(75) Inventor: Carlos Manzanares, Tampere (FI)

(73) Assignee: Nokia Corporation, Espoo (FI)

( * ) Notice: Subject to any disclaimer, the term of this patent is extended or adjusted under 35 U.S.C. 154(b) by 1955 days.

(21) Appl. No.: 10/736,632

(22) Filed: Dec. 17, 2003

(65) Prior Publication Data

US 2004/0180663 A1  Sep. 16, 2004

Related U.S. Application Data

(63) Continuation-in-part of application No. 10/347,383, filed on Jan. 21, 2003, now abandoned.

(60) Provisional application No. 60/438,503, filed on Jan. 8, 2003.

(51) Int. Cl.
*H04L 12/28* (2006.01)

(52) U.S. Cl.
USPC ............................................ 370/408; 455/449

(58) Field of Classification Search
USPC ............ 370/351, 254; 709/229, 223; 455/403, 455/433
See application file for complete search history.

(56) References Cited

U.S. PATENT DOCUMENTS

| | | | |
|---|---|---|---|
| 5,586,255 A * | 12/1996 | Tanaka et al. ................. | 709/223 |
| 6,188,898 B1 * | 2/2001 | Phillips .......................... | 455/433 |
| 6,477,566 B1 * | 11/2002 | Davis et al. .................... | 709/223 |
| 6,549,533 B1 * | 4/2003 | Campbell ...................... | 370/351 |
| 6,601,195 B1 * | 7/2003 | Chirashnya et al. ............ | 714/43 |
| 6,732,170 B2 * | 5/2004 | Miyake et al. ................. | 709/223 |
| 6,967,931 B2 * | 11/2005 | Park et al. ...................... | 370/254 |
| 7,260,397 B2 * | 8/2007 | Virtanen et al. ........... | 455/435.3 |
| 7,747,714 B1 * | 6/2010 | Hirsch .......................... | 709/223 |
| 2001/0037395 A1 * | 11/2001 | Sabat et al. .................... | 709/229 |
| 2001/0042118 A1 * | 11/2001 | Miyake et al. ................. | 709/223 |
| 2002/0006779 A1 * | 1/2002 | Park et al. ...................... | 455/403 |
| 2002/0029298 A1 * | 3/2002 | Wilson .......................... | 709/316 |
| 2003/0162537 A1 * | 8/2003 | Hirsch .......................... | 455/423 |

OTHER PUBLICATIONS

Configuration Management; 3G configuration management; Concept and main requirements (3GPP TS 32.600 version 4.0.0 Release 4, Jun. 2001.*

3GPP TS 32.600 version 4.0.0 Release 4, "Digital cellular telecommunications system (Phase 2+) (GSM); Universal Mobile Telecommunications System (UMTS); Telecommunication Management; Configuration Management; Concept and main requirements", Jun. 2001.

3GPP TS 32.102, V6.0.0, "3rd Generation Partnership Project; Technical Specification Group Services and System Aspects; Telecommunication management; Architecture", Release 6, Sep. 2003.

* cited by examiner

*Primary Examiner* — Phirin Sam
(74) *Attorney, Agent, or Firm* — Mintz, Levin, Cohn, Ferris, Glovsky & Popeo, P.C.

(57) ABSTRACT

The invention relates to a hierarchical radio network operations system (OS) and a method for controlling a mobile communications network by a hierarchical radio network OS, the hierarchical radio network OS comprising at least one radio network OS on a subordinate level and a radio network OS on a superior level, wherein after a controlling action is initiated a demand for data depending on the controlling action is forwarded from the superior level OS to at least one subordinate level OS. The latter in response to the call forwards the demanded data to the radio network OS on the superior level.

23 Claims, 4 Drawing Sheets

METHOD AND HIERARCHICAL RADIO NETWORK OPERATIONS SYSTEM FOR CONTROLLING A MOBILE COMMUNICATIONS NETWORK

CROSS REFERENCE TO RELATED APPLICATIONS

This application is a Continuation-In-Part Application of U.S. application Ser. No. 10/347,383, filed Jan. 21, 2003 entitled, "Method and Hierarchical Radio Network Operations System For Controlling a Mobile Communications Network" and claims the benefit of the filing date of U.S. provisional Application Ser. No. 60/438,503, filed on Jan. 8, 2003, entitled "Method and Hierarchical Radio Network Operations System for Controlling a Mobile Communication Network" which applications are incorporated herein by reference in their entirety.

FIELD OF THE INVENTION

The present invention relates to a hierarchical radio network operations system (OS) and a method for controlling a mobile communications network by a hierarchical radio network OS, the hierarchical radio network OS comprising at least one radio network OS on a subordinate level, also referred to as subordinate network, and a radio network OS on a superior level, also referred to as superior network.

BACKGROUND OF THE INVENTION

Configuration Management (CM), as specified by the third generation partnership project (3GPP), in general, provides an operator of a 3G mobile communications network (hereafter 3G network) with the ability to ensure correct and effective operation of the network. CM actions, also referred to as controlling actions, either initiated by the operator or by functions in an operations system (OS), have the objective to control and monitor the actual configuration on network elements (NEs) and network resources (NRs). Herein the NR denotes a component of a NE which can be identified as a discrete separate entity in an object oriented environment. The NR itself and, consequently, the NE is represented by an abstract entity, the so-called managed object (MO). CM actions may be requested as part of an implementation programme (e.g. additions and deletions on a 3G network), as a part of an optimisation programme (e.g. modifications), and to maintain the overall quality of service (QOS). The CM actions are initiated either as single actions on single NEs of the 3G network, or as part of a complex procedure involving actions on many resources/objects in one or several NEs. They are executed by a set of controls defined in the 3GPP technical specification (TS) 32.600. According to this specification the management of a network is accomplished by a package of end-user functions, provided by the so-called network manager (NM). The NM is supported by an element manager (EM) in turn providing a package of end-user functions for management of a set of closely related types of NEs.

According to another 3GPP-technical specification, TS 32.102, the communication between the NM and the NE via the EM or via direct access is based on an open standardized interface (Itf-N). The Itf-N is an object oriented interface, i.e. all resources of the 3G network whose management is standardized are represented as managed object instances (MOI) of a network resource model (NRM).

However, the CM is addressed to the management of 3G networks on a regional level only, i.e. it defines the specifications for internally controlling a radio network supported by a single provider. Whereas, in future, operators should be able to control radio networks on a higher level, that is to say initiating controlling actions on the part of the superior radio network OS affecting one or a plurality of radio networks on the regional level, e.g. GSM networks or/and 3G networks. Therefore, data necessary for controlling the regional radio networks, e.g. managed objects, managed objects parameters and their values, have to be synchronized between the radio network OSs on the regional level and the radio network OS on the superior level. Whereas, according to the above specifications, the regional radio network OS has an accurate and up to date picture of how the actual radio network is set up there is presently no such specification facilitating a configuration management on a superior level, e.g. provisioning and changing radio network parameters of neighbouring radio network cells supported by different manufacturer's equipment and supported by different providers at the same time.

Recently, a configuration management project, so-called mobile common configuration management (MCCM), was developed showing how mobile network operators can provision and change radio parameters for all affected GSM and UMTS cells supported by different providers using a flow-through process controlled by a single tool. The proposed MCCM solution is based on a regular upload, e.g. of radio network parameter data from radio network OSs on a regional level to a radio network OS on a superior level. The upload operation thereby comprises the steps of regularly fetching radio network data from all regional radio network OSs stored in their regional data bases (DB), exporting these data by the regional radio network OS, importing the data by the superior radio network OS and storing these data in a data base on the superior level. For the exporting and importing action a Bulk CM interface is used which is a part of the standardized Itf-N interface mentioned above. For further details see 3GPP TS 32.600.

However, the regular upload solution proposed by the 3GPP MCCM architecture implicates that the superior radio network OS has to handle a huge amount of data within a short period of time. Thus, it requires an equipment with large memory and computing power. Since the loading time is a non-operative time the regional radio network OSs and the superior radio network OS, as well, are out of normal order for too long. Therefore, the loading operation reasonably can only be scheduled during night, i.e. once a day. Accordingly, the data is in average 12 hours old which may restrict the usability of the data for some applications or controlling actions. A further drawback of the 3GPP MCCM solution is that due to the huge amount of data, actually, not all data available in the radio network OS on regional level can be uploaded, so that a filtering process appears to be essential to reduce the amount of data to a reasonable volume. Consequently, only a subset of managed object parameters and their values are available for controlling or managing the radio networks restraining the controlling actions and controlling functions available for the superior radio network OS. Therefore, management tools available for radio network OSs on the regional level provided by respective vendors suffer losses in functionality or can not at all be used on the superior level.

SUMMARY OF THE INVENTION

Therefore, it is an object of the present invention to provide a hierarchical radio network OS and a method for controlling a mobile communications network by a hierarchical radio network OS which overcomes the aforementioned drawbacks, particularly, which provides an up-to-date picture of the regional radio networks.

It is a further object of the present invention to provide a hierarchical radio network OS and a method for controlling a mobile communications network by a hierarchical radio network OS wherein the computer load in the regional networks OSs and the computer load and the memory consumption in the superior radio network OS is reduced. Thus, the cost for the superior radio network OS can be reduced.

It is a third object of the present invention to provide a hierarchical radio network OS and a method for controlling a mobile communications network by a hierarchical radio network OS which reduces the non-operative time of the participating superior and subordinate radio network OSs.

A fourth object of the present invention is to provide a hierarchical radio network OS and a method for controlling a mobile communications network by a hierarchical radio network OS that maximizes the reusability of the controlling applications already developed for the regional radio network OSs also for the superior radio network OS.

According to a first aspect of the invention, these objects are achieved by a method for controlling a mobile communications network by a hierarchical radio network operations system with at least one radio network operations system on a subordinate level and a radio network operations system on a superior level comprising the steps of initiating a controlling action on the part of the radio network operations system on the superior level, generating a call for data depending on the controlling action, forwarding the call to at least one of the radio network operations systems on the subordinate level affected by the controlling action, providing data on the part of the radio network operations systems on the regional level affected by the controlling action in response to the call, and forwarding the data to the radio network operations system on the superior level.

According to a second aspect which constitutes a further development of the first aspect of the invention, the controlling action is executed on the basis of the retrieved data.

According to a third aspect which constitutes a further development one of the first and second aspects of the invention, the method further comprises the steps of retrieving data by the radio network operations system on the superior level from at least one of the radio network operations systems on the subordinate level, exporting the retrieved data by the radio network operations system on the subordinate level, importing the data by the radio network operations system on the superior level, and storing the imported data to data storing means in the radio network operations system on the superior level.

According to a fourth aspect which constitutes a further development of the third aspect of the invention, the method further comprises the steps of ascertaining whether the call for data demanded depending on the controlling action is to be forwarded to the radio network operations system on the subordinate level affected by the controlling action, forwarding the call for data to the data storing means when the call is not to be forwarded to the radio network operations system on the subordinate level, providing data on the part of the data storing means in response to the call, and forwarding the data within the radio network operations system on the superior level.

According to a fifth aspect which constitutes a further development of the fourth aspect of the invention, the method further comprises the steps of ascertaining whether the data demanded depending on the controlling action can be received from the radio network operations system on the subordinate level affected by the controlling action within a predetermined latency, and forwarding the call for data to the data storing means when the data can not be received within a predetermined latency before providing data on the part of the data storing means.

According to a sixth aspect which constitutes a further development of one of the first to fifth aspects of the invention, the controlling action comprises monitoring and controlling a configuration of radio network elements and/or radio network resources.

According to a seventh aspect which constitutes a further development of one of the first to sixth aspects of the invention, the data demanded depending on the controlling action comprise network elements parameters and/or network resources parameters of the radio network on the subordinate level.

According to an eighth aspect which constitutes a further development of one of the first to seventh aspects of the invention the data demanded depending on the controlling action comprise topology data of the radio network on the subordinate level.

According to a ninth aspect which constitutes a further development of one of the first to eighth aspects of the invention said radio network operations system on a subordinate level is an operations system for managing a regional radio network.

According to a tenth aspect of the invention, the above objects are achieved by a hierarchical radio network operations system for controlling a mobile communications network, the hierarchical radio network operations system comprising at least one radio network operations system on a subordinate level, a radio network operations system on a superior level, initiating means being part of the radio network operations system on the superior level arranged for initiating a controlling action, call generating means arranged for generating a call for data depending on the controlling action, a first interface between said radio network operations system on the subordinate level and said radio network operations system on the superior level arranged for forwarding the call to at least one of the radio network operations systems on the subordinate level affected by the controlling action and for receiving data to the radio network operations system on the superior level, and first providing means being part of the radio network operations system on the subordinate level arranged for providing data in response to the call.

According to an eleventh aspect which constitutes a further development of the tenth aspect of the invention the hierarchical radio network OS further comprises executing means arranged for executing the controlling action on the basis of the retrieved data.

According to a twelfth aspect which constitutes a further development of one of the tenth and eleventh aspects of the invention the hierarchical radio network OS further comprises retrieving means being part of the radio network operations system on the superior level arranged for retrieving data from at least one of the radio network operations systems on the subordinate level, exporting means being part of the radio network operations system on the subordinate level arranged for exporting the retrieved data, importing means being part of the radio network operations system on the superior level arranged for importing the data, and data storing means being part of the radio network operations system on the superior level arranged for storing the imported data.

According to a thirteenth aspect which constitutes a further development of the twelfth aspect of the invention the hierarchical radio network OS further comprises first ascertaining means being part of the radio network operations system on the superior level arranged for ascertaining whether the call for data demanded depending on the controlling action is to be forwarded to the radio network operations system on the subordinate level affected by the controlling action, second providing means being part of the radio network operations system on the superior level arranged for providing data stored in the data storing means in response to the call, and a second interface within said radio network OS on the superior level arranged for forwarding the call for data to said second providing means when the call is not to be forwarded to said radio network operations system on the subordinate level and for forwarding the data provided by said second providing means within the radio network operations system on the superior level.

According to a fourteenth aspect which constitutes a further development of the thirteenth aspect of the invention the first and second interfaces are uniform interfaces.

According to a fifteenth aspect which constitutes a further development of the thirteenth or fourteenth aspect of the invention the hierarchical radio network OS further comprises second ascertaining means being part of the radio network operations system on the superior level arranged for ascertaining whether the data demanded depending on the controlling action can be received from the radio network operations system on the subordinate level affected by the controlling action within a predetermined latency, said second interface further being arranged for forwarding the call for data to said second providing means when the data can not be received within a predetermined latency.

According to a sixteenth aspect which constitutes a further development of one of the tenth to fifteenth aspects of the invention the hierarchical radio network OS further comprises monitoring means arranged for monitoring configuration of radio network elements and/or radio network resources and controlling means arranged for controlling configuration of radio network elements and/or radio network resources.

According to a seventeenth aspect which constitutes a further development of one of the tenth to sixteenth aspects of the invention said call generating means, said first and second interfaces, and said first and second providing means are arranged for generating and forwarding a call for network elements parameters and/or network resources parameters and for forwarding and providing said parameters.

According to an eighteenth aspect which constitutes a further development of one of the tenth to seventeenth aspects of the invention the call generating means, said first and second interfaces, and said first and second providing means are arranged for generating and forwarding a call for topology data and for forwarding and providing said topology data.

According to an nineteenth aspect which constitutes a further development of one of the tenth to eighteenth aspects of the invention the first and second interfaces and said first and second providing means comprise topology reading means and managed object reading means.

According to a twentieth aspect which constitutes a further development of one of the thirteenth to nineteenth aspects of the invention the hierarchical radio network OS further comprises second data storing means being part of the radio network operations system on the superior level arranged for storing planned data, third providing means being part of the radio network operations system on the superior level arranged for providing said planned data, and a third interface within the radio network OS on the superior level arranged for forwarding the call for data to said third providing means and for receiving said planned data within the radio network operations system on the superior level.

According to a twenty first aspect which constitutes a further development of one of the tenth to twentieth aspects of the invention said radio network operations system on a subordinate level is an operations system for managing a regional radio network.

Controlling herein means e.g. modifying, monitoring the actual set-up and/or planning a future set-up of one or several mobile communication networks. Thus, the controlling action based on the retrieved data can either be executed on the part of the superior radio network OS, the subordinate radio network OS or both.

The radio network OS on the subordinate level preferably is a regional radio network OS for managing operator's mobile network regions such as operator's GSM networks or 3G networks for example, but may also be any other even higher ranking OS. Preferably, the hierarchical radio network operations system according to the invention comprises a plurality of such subordinate radio network OSs and one superior radio network OS.

The method and system according to the invention overcomes the above-mentioned problems directly accessing the actual data from the regional radio network OSs, by generating a specific call for data. Namely, the call is generated in response to a controlling action initiated e.g. by the operator or by functions of the superior radio network OS. Consequently, it is possible to fetch data from regional radio network OS only of those radio networks which are affected by the controlling action. In other words the remote calls from the superior radio network OS are made only on demand. As a result, the data transfer to the superior network OS occurs on demand, too. Thereby, the dataflow is reduced to an amount actually requested reducing the performance requirements for controlling actions and the non-operative time for controlling actions in the total hierarchical radio network OS.

Since the data can be forwarded directly without filtering from the regional network OSs to the superior network OS the same management applications can be applied in both levels.

BRIEF DESCRIPTION OF THE DRAWINGS

The above and other objects, features and advantages of the present invention will become apparent from the following description of preferred embodiments thereof taken in conjunction with the accompanying drawings in which.

Figure 1:
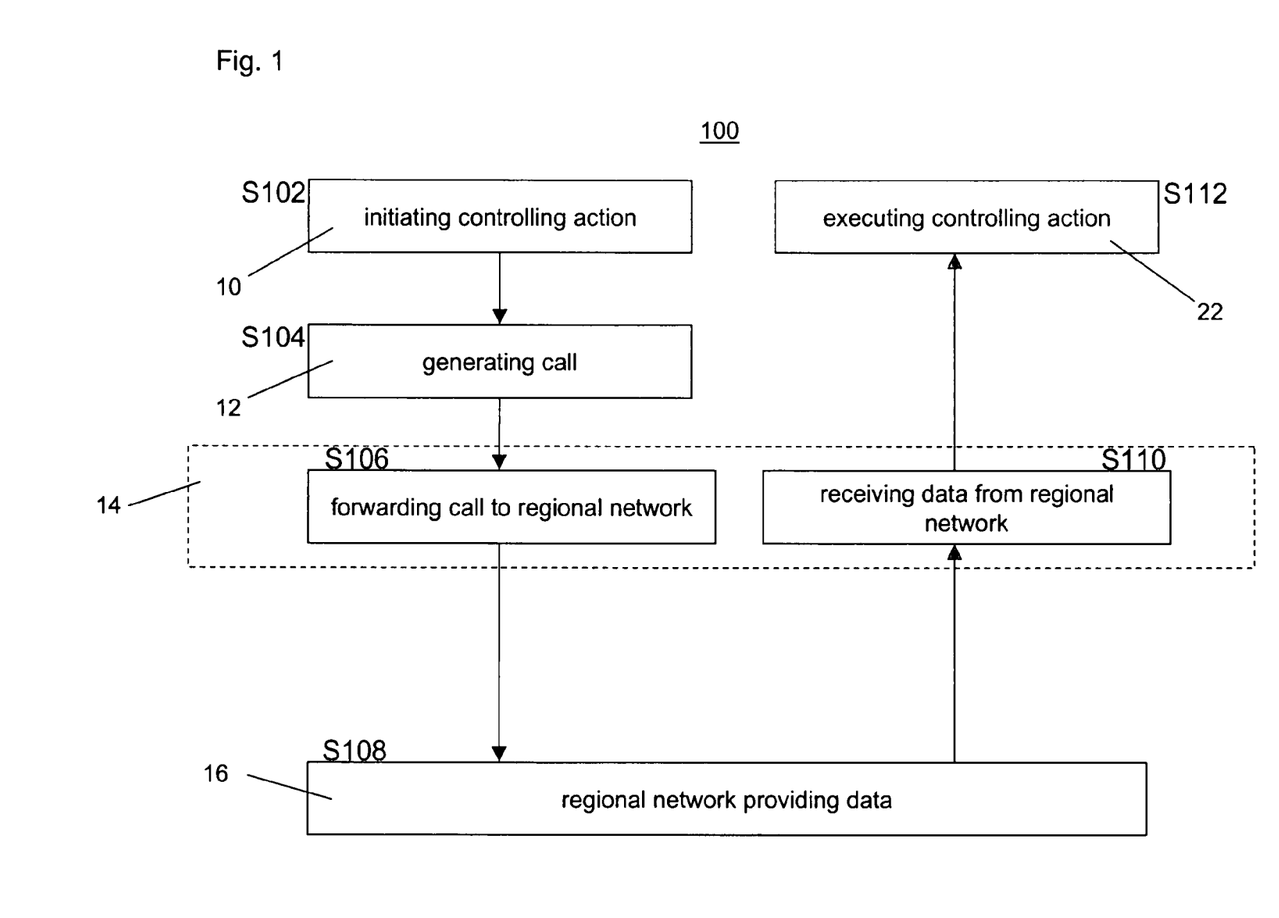
FIG. 1 shows a flow diagram of a first embodiment of the method and OS according to the present invention.

A first embodiment of a hierarchical radio network OS 100 and a method for controlling a mobile communications networks by a hierarchical radio network OS 100 according to the present invention illustrated in FIG. 1 applies to the most simple case when communication between the regional radio network OS(s) (only one regional OS is exemplified) and the superior radio network OS proceeds via a first interface 14. In this case, when in a first step S102 the operator or functions in an operations system in the superior network initiates via initiating means 10 a controlling action a call is generated in step S104 by call generating means 12 requesting for data. These data are typically topology data (like MOs), MO parameters and MO parameter values required for the execution of the controlling action.

The CM actions are executed by a set of controls such as e.g. defined in the 3GPP TS 32.600. Thus, the initiating means 10 can be any of these controls. The initiating means 10 further stand for e.g. a command or a subroutine in management tool further including one or several of these controls initiating a CM action. They further may be implemented as a command or subroutine belonging to any other CM tool, in particular to a CM tool for modifying, monitoring the actual set-up and/or planning a future set-up of one or several mobile communications networks such as GSM or/and 3G mobile communication networks.

The call generating means 12 can be implemented as e.g. a request or a loading command within such a control or CM tool addressed to those radio network OS(s) on the regional level which are affected by the controlling action. In step S106 the call is forwarded via the interface 14 to respective regional network OS(s), only. The regional network OS(s) receiving the call then provide the requested data stored in regional DBs (not shown in FIG. 1). The first providing means 16 typically comprise a loader (not shown in FIG. 1) for reading out data contained in said regional DB (not shown in FIG. 1). The first providing means may further be arranged to implement the first interface 14 in the regional network OS in order to forward the data between the OSs. Alternatively, the first interface 14 may be implemented by separate forwarding means such as a message program for example. For details regarding a possible implementation of the first interface 14 and the first providing means 16, see FIGS. 3 and 4 and the corresponding description. The data provided by the first providing means 16 in response to the call is received in the superior radio network OS in step S110 via the first interface 14. The controlling action is executed in step S112 based on the received data by executing means 22 such as the above mentioned set of controls as defined in the 3GPP TS 32.600 or any other management application for e.g. modifying, monitoring the actual set-up and/or planning a future set-up of one or several mobile communications networks such as GSM or/and 3G mobile communication networks. Executing the controlling action in step S112 may initiate a new controlling action, thus a call requesting the controlling action will be generated and forwarded to regional OS(s). A regional OS performs CM actions mentioned above on the regional level.

The controlling action can be based on planned data retrieved e.g. from a network planning tool, from a DB belonging to the superior radio network OS and/or from one or a plurality of DBs belonging to any of the regional radio network OSs affected by the controlling action. The data stored in the regional OSs providing an accurate and up to date picture of how the actual radio networks are set up in the particular regions are available on demand also for the superior radio network OS thanks to the method described above. The network data (also referred as actual data or actual status) stored in the regional OS is typically up to date because of regular network data uploads and/or because the network sends events to the regional OS indicating changes in the network set-up, that is e.g. changes in network topology or in network parameters.

In a more complicated case than outlined in connection with the first embodiment the data may not be directly accessible from each regional network OS either because of a lack of compatibility, e.g. the aforementioned interface is not supported by respective regional network OS, or because the response time of the addressed regional radio network OS is too high due to a high customer's data communication network (DCN) latency. If so, according to a second embodiment of the invention data storing means such as e.g. a data base (DB) and the corresponding tools for operating such a data base, being part of the superior level OS are arranged for storing network data of at least one predetermined regional radio network received e.g. in a regular upload method as suggested by the MCCM solution mentioned above. The decision whether or not regional network data are to be stored in the superior database via regular upload as well as the decision whether a call for data is to be forwarded to the appointed regional network OS or to the superior DB will preferably be made in advance, e.g. by a system manager or by a network operator.

Figure 2:
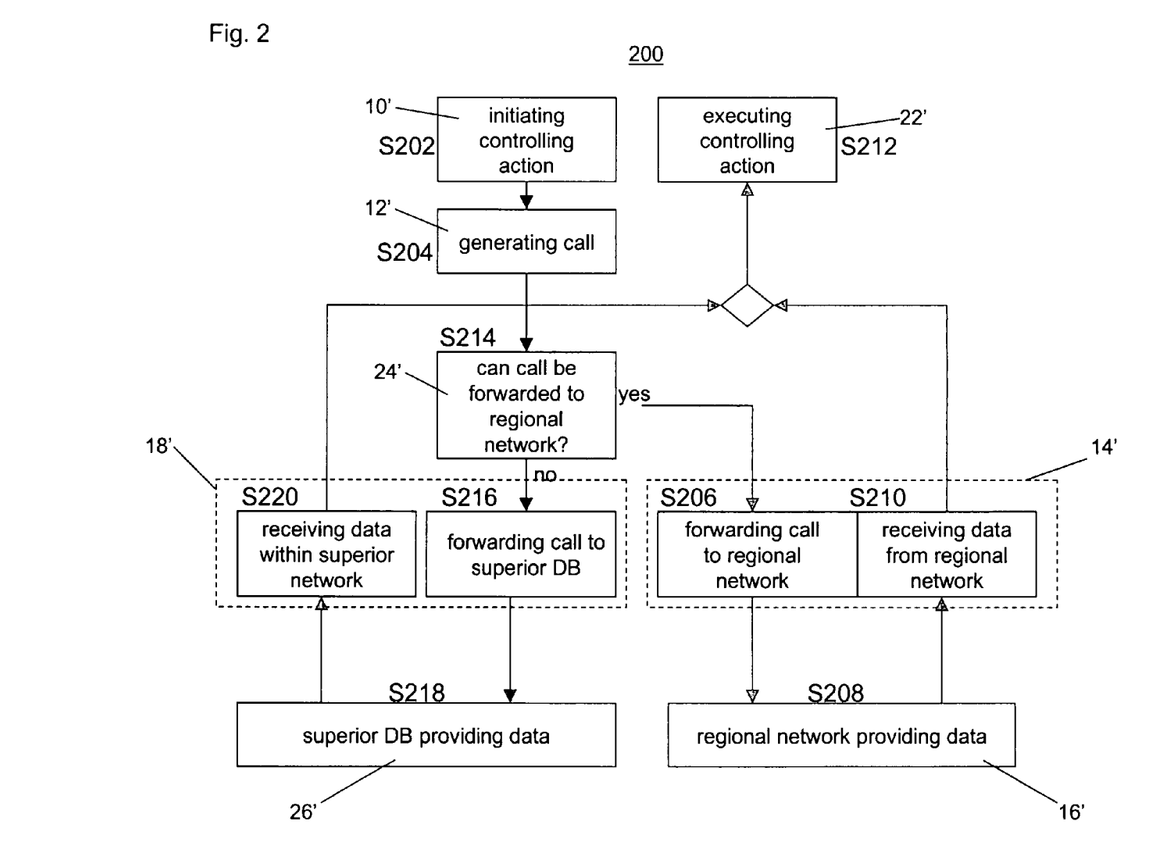
FIG. 2 shows a flow diagram of a second embodiment of the method and OS according to the present invention.

Therefore, the second embodiment of the present invention as illustrated in FIG. 2 will be applied to a hierarchical radio network OS comprising at least one regional network OS not being directly accessible via said first interface. According to this embodiment a device 200 for controlling a hierarchical radio network OS comprises first ascertaining means 24' within the superior radio network OS for ascertaining in step S214 whether the call generated in steps S202, S204 in the same manner as described in conjunction with FIG. 1 above (S102, S104) is to be forwarded to the regional radio network OS(s) it is addressed to. Ascertaining in this regard, for example, may mean retrieving whether or not a flag is set by a system manager or by a network operator indicating that the call is not to be forwarded to the regional network OS(s) e.g. due to a lack of compatibility and/or due to a high DCN latency. Consequently, the first ascertaining means 24' may be implemented as a corresponding request or read command and a decision-making procedure. A reason for not to forward the call to one or several regional network OS(s) may also be that network data of regional radio network(s) required for the controlling action is already available in the superior radio network OS and stored e.g. in superior DB or in a temporary memory means in the superior OS (not shown in figures). That kind of situation is possible for example when controlling actions are executed consecutively. Ascertaining in this regard, for example, may mean comparing time stamps of the stored data to a threshold value(s) set in the superior radio network OS by a system manager or by a network operator. Instead of a flag or threshold value(s) the superior network can also be fixedly set up. The set up typically executed during the installation of the superior network OS or during the integration of a subordinate OS then includes one or several configuration files providing information how to fetch data from each regional network connected to the superior network. The respective decisions have to be made in advance. In that case, the first ascertaining means 24' simply determine the parameters set in the configuration file(s). Therefore they may be implemented as a corresponding read command and a decision-making procedure.

If a call for data is not to be forwarded to the regional radio network OS(s) it is addressed to the call is forwarded in step S216 via a second interface 18' to second providing means 26' belonging to the superior radio network OS. The second providing means 26' receiving the call then provides the requested data stored in superior radio network OS DB (not shown in FIG. 2) in step S218. The second providing means 26' typically comprise a loader (not shown in FIG. 2) for reading out data contained in said superior DB, not shown in FIG. 2. The second providing means 26' may further implement the second interface 18'. Alternatively, the second interface 18' may be implemented by separate forwarding means such as a message program for example. Anyway, the data provided by the second providing means 26' is forwarded within the superior radio network OS in step S220 via the second interface 18'. The controlling action is executed in step S212 by executing means 22' based then on the regularly uploaded data, thereby accepting the drawbacks mentioned above. The executing means 22' can be implemented as the above mentioned set of controls as defined in the 3GPP TS 32.600 or any other management application for e.g. modifying, monitoring the actual set-up and/or planning a future set-up of one or several mobile communications networks such as GSM or/and 3G mobile communication networks. For details regarding a possible implementation of the second interface 18' and the second providing means 26' see FIGS. 3 and 4 and the corresponding description.

In the other case, i.e. when a call for data is to be forwarded to the regional radio network OS it is addressed to, the call is forwarded in step S206 via first interface 14' from the radio network OS on the superior level to the radio network OS on the subordinate level to said regional radio network OS(s). This step and the following steps S208, S210, S212 take place according to the method as described in conjunction with FIG. 1: first providing means 16' provide the retrieved data which are then forwarded via the first interface 14' and received by the OS on the superior level to be used by the executing means 22'.

If the ascertaining means 24' ascertain in step S214 that the call is to be forwarded to the regional radio network OS(s) and as, however, the case arises that e.g. the latency is too high in a further embodiment of the present invention second ascertaining means (not shown in figures) may be provided within the superior network OS ascertaining after step S214 whether or not the demanded data can be received from the appointed regional radio network OS(s) within a predetermined latency. Accordingly, an additional decision whether or not the call for data is to be forwarded to an appointed regional network is made in real time by second ascertaining means being implemented as e.g. a time out command within the superior radio network OS itself. If the response time is too high, that is if the data can not be received within the predetermined latency the call will again be forwarded via the second interface 18' in a next step to said second providing means 26'. In the same manner as described above the second providing means 26' will provide the retrieved data which are forwarded via said second interface 18' within the superior network OS for finally executing the controlling action by executing means 22' such as management applications, for example. If the data can be received within the predetermined latency in step S208 the next steps comply with steps S210 and S212.

Both, first and second interfaces 14' and 18' may be identically implemented. Particularly, both interfaces may use the same language, codes, and/or communication protocols. In this case they are referred to as unified or uniform interfaces.

Figure 3:
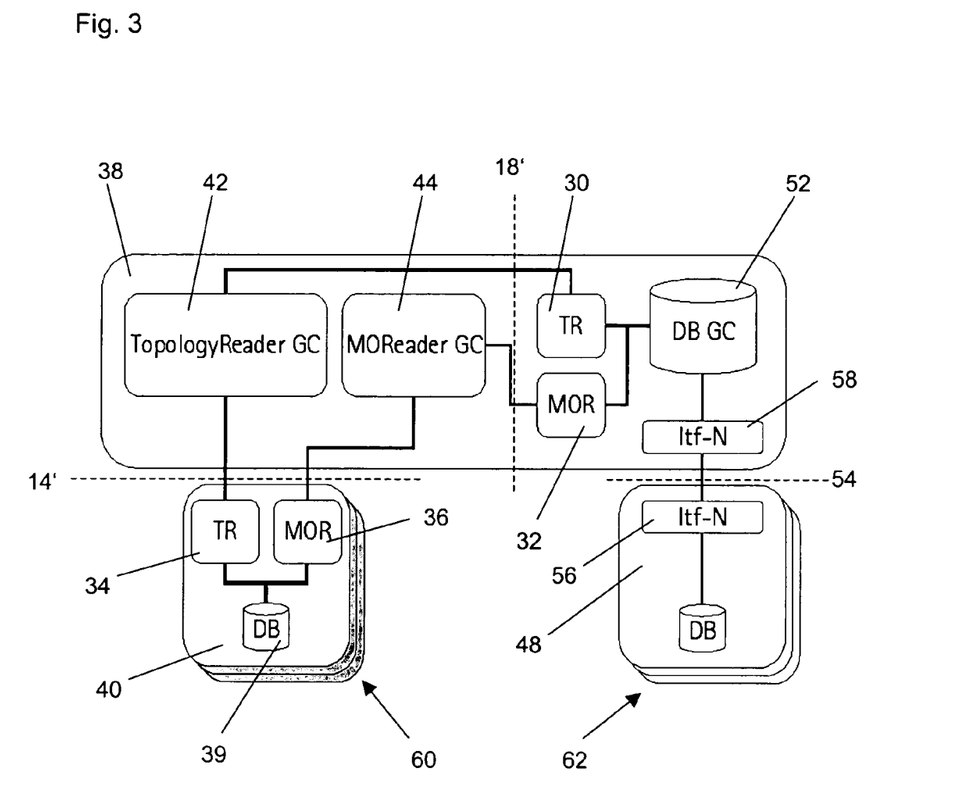
FIG. 3 shows a schematic partial illustration of the second embodiment of the OS according to the present invention.

The second embodiment of the present invention described in conjunction with FIG. 2 is partially illustrated in more detail in FIG. 3. According to this embodiment the data to be transferred is split in two parts: topology data and managed object (MO) data, respectively. Consequently, the data handling components, i.e. providing means and, if present, separate forwarding means implementing the interfaces have to be adapted. Therefore, the demand for data generated in the manner described above will be forwarded via (unified) interface 14' either implemented by a topology reader 42 or by a managed object (MO) reader 44 to that regional network OSs 60 to which it is addressed, in the illustrated example to regional network OS 40. The topology reader 42 when it forwards the call invokes a topology reader 34 installed in the regional network OS 40. The MO reader 44 when it forwards the call invokes a MO reader 36 in the regional network OS 40. In the illustrated embodiment the topology reader 42 and the MO reader 44 are separate modules on the side of the superior OS implementing interface 14' and being responsible for forwarding the call to and receiving the data of the regional network OSs 60. The interface may further be implemented as modules integrated in other data processing tools such as said ascertaining means 24' (not shown in FIG. 3), CM applications or single controls being part of CM applications, for example.

Topology reader 34 and MO reader 36 are functional elements responsible for readout of topology and MO data from regional data base 39. According to FIG. 3, they further exemplify possible implementations of said first providing means 16'. In addition, the reader modules 34, 36 may implement communication functionality for the first (unified) interface 14' on the side of the subordinate OS. Naturally the communication functionality can be implemented as separate forwarding means within the subordinate OS, thus the separate module can serve both of the reader modules for example.

The above implementation of the first (unified) interface 14' and the first providing mans 16' as topology reader 34, 42 and MO reader 36, 44, respectively, are applicable in the same manner to the first (unified) interface 14 and providing means 16 of the first embodiment shown in FIG. 1. However, with regard to both embodiments (FIG. 1 and FIG. 2) the interfaces, if present, forwarding means, and providing means may alike comprise single reader modules. Furthermore, the interfaces, forwarding means, and providing means may be subdivided into three or more reader modules depending on the diversity of data to be handled. Hence, the invention can be applied to sets of data other than topology data and MO data.

If regional network OSs 62 other than the regional network OSs 60 do not support the unified interface 14', e.g. regional network OS 48, the demand for data will be forwarded via interface 14' implemented either by the topology reader 42 or by the managed object reader 44 in response to the output result of the first ascertaining means 24', not shown in FIG. 3. That is to say, the topology reader 42 when it forwards the call invokes a topology reader 30 and the MO reader 44 when it forwards the call invokes a MO reader 32. In this case the data will be received from a superior database (DB) 52. Whereby, topology reader 30 and MO reader 32 are functional elements responsible for readout of topology and MO data from superior data base 52. They further exemplify possible implementations of said second providing means 26' within the superior network OS 38. In addition, the reader modules 30, 32 may implement communication functionality for the second (unified) interface 18'. Naturally the communication functionality can be implemented as separate forwarding means within the superior OS, thus the separate module can serve both of the reader modules for example.

Also in this case the forwarding means, if present, and the providing means 26' implementing the second interface 18' may alike comprise single reader modules in superior level OS or may be subdivided into three or more reader modules depending on the diversity of data to be handled, so that again the invention can be applied to sets of data other than topology data and MO data.

The data stored in DB 52 are typically updated once a day during night. This regular update process is communicated via the aforementioned Itf-N interface 54 described in the introductory part of the present document. Data retrieved by the DB 52, particularly by retrieving means not explicitly shown FIG. 3, are exported by exporting means 56 on the regional level and then imported by importing means 58 on the side of the superior level. Both, exporting means 56 and importing means 58 implement the Bulk CM part of the above-mentioned Itf-N interface. Subsequently, the data are stored in the DB 52.

The method and OS according to the second embodiment of the present invention, thus, differentiates between two kinds of regional network OSs: firstly regional network OSs 60 which are able to communicate data on demand using the interface 14', and such regional network OSs 62 which are not able to communicate data on demand, therefore, using the regular upload interface 54 as suggested by MCCM. Nevertheless, the method and OS according to the second embodiment of the present invention allows the communication within the hierarchical radio network operations system comprising both kinds of regional radio network OSs. It is sort of an universal controlling method and device. It further allows to apply in a simple manner the same CM tools in the superior radio network OS 38 and in the regional network OSs 60 in so far data are communicated via interface 14'. Thus, the invention overcomes the aforementioned problems at least accessing directly the actual data stored in the regional network OSs 60 and providing it in its entirety. With regard to these regional networks OSs 60 no unnecessary load to the superior radio network OS 38 due to export/import operations is generated. The computing load and memory consumption is distributed across these regions 60 so that system hardware does not require a different dimensioning in the superior network OS 38 compared with the regional network OSs 60.

Figure 4:
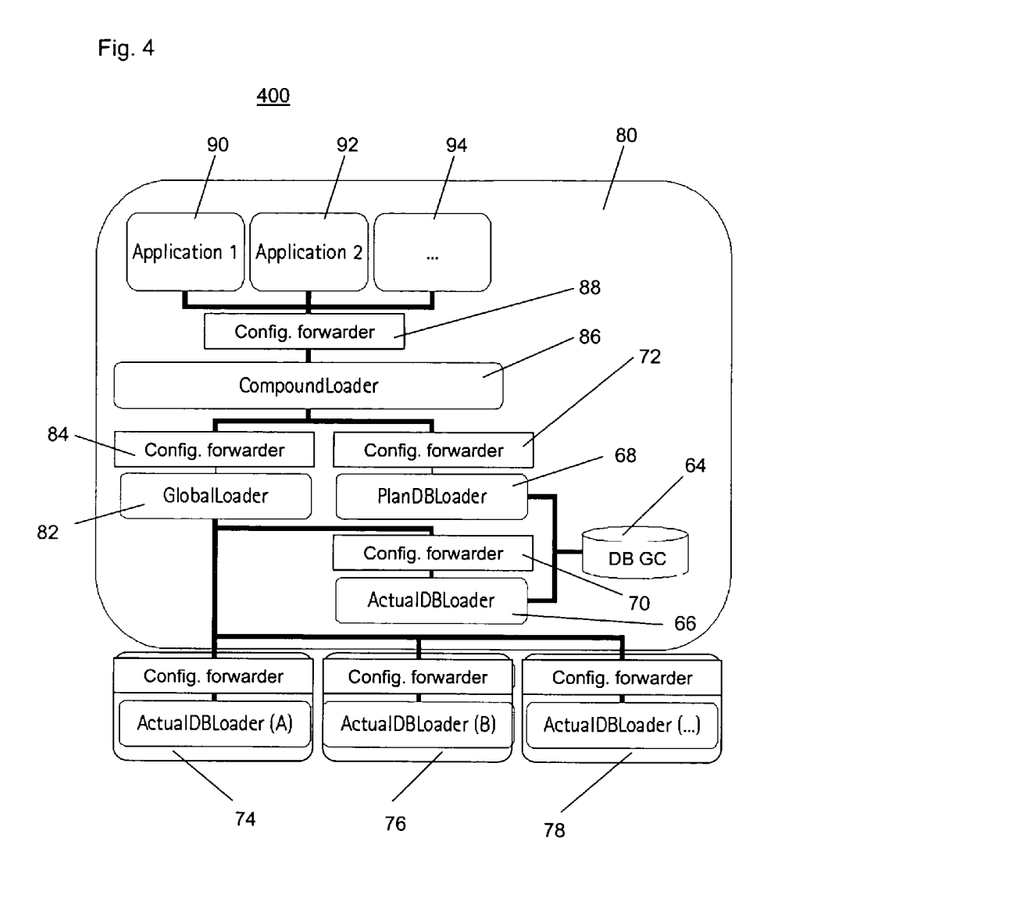
FIG. 4 shows schematic illustration of an OS according to a further embodiment of the present invention.

The hierarchical OS 400 schematically shown in FIG. 4 exemplifies how the invention can be applied to a specific set of data stored in a DB 64 on the superior level for management of a mobile communications network. Namely, according to this embodiment the set of data contains actual data representing the actual status of regional networks not able to communicate via the unified interface (not explicitly shown in FIG. 4) and plan data representing information on the planned radio network configuration. Thus, it differs from the device shown in the previous figures by comprising separate means for providing and forwarding actual data and for plan data, respectively.

In particular, DB 64 being part of data storing means in the superior network OS 80 is arranged for storing actual data of regional data bases not able to communicate via said unified interface (not explicitly shown in FIG. 4) as well as for storing plan data. Connected to the DB 64 one can find an actual data DB loader 66 as second providing means and a plan data DB loader 68 as third providing means. Both providing means 66, 68 invoke configuration forwarder 70 and 72, respectively, each of which implements said unified interface (not explicitly shown in FIG. 4). Actual data stored in the DB 64 in the superior network OS 80 as well as actual data stored in distributed data bases in regional network OSs 74, 76, 78, each being provided and forwarded via said unified interface in the manner described above are accumulated by a global loader 82 (a forwarding means) which provides these data invoking configuration forwarder 84. Whereby, configuration forwarder 84 communicates via said unified interface, too. In parallel, the plan data DB loader 68 provides plan data and invokes the forwarder 72. A further providing means 86, the so called compound loader accumulates data received from forwarders 72, 84 and provides the mixed actual and plan data to a further configuration forwarder 88 which is arranged to communicate with controlling applications 90, 92, 94 thereby implementing the same unified interface standard as described above in conjunction with FIGS. 1 to 3. Thus, said interface is utilized throughout each level of the hierarchical radio network OS 400 shown in FIG. 4. Said data are collected on demand in order to execute one or several applications activated e.g. by an operator or an operating function in the superior radio network OS.

It is noted, that the present invention is not restricted to the above preferred embodiments but may be used for controlling a mobile communications network by a hierarchical radio network operations system of any other kind. In particular, the hierarchical radio network operations system may also comprise three or even more management levels. In particular, the radio network OS on a subordinate level according to any of the above embodiments may be an OS for controlling a regional radio network or may be a higher ranking OS. Moreover, the unified interface is not restricted to a subdivision as shown in FIG. 3. The providing means and forwarding means therein may be subdivided into three or more elements depending on the diversity of data to be handled. Separate means for forwarding and/or receiving calls and data implementing said (unified) interfaces and providing means may comprise software as well as hardware components installed for the handling of data. The unified interface may be conceived as an open interface offered for applications outside of CM applications, too. The invention can further be applied to sets of data other than a set comprising actual data and plan data as exemplified by FIG. 4.

The invention claimed is:

1. A method, comprising:
controlling a mobile communications network by a hierarchical radio network operations system with at least one radio network operations system on a subordinate level and a radio network operations system on a superior level, wherein the controlling comprises initiating a controlling action on the part of the radio network operations system on the superior level;
generating, at the radio network operations system on the superior level, a call for data depending on the controlling action;
forwarding the call to at least one of the radio network operations systems on the subordinate level affected by the controlling action;
providing data on the part of the radio network operations system on the subordinate level affected by the controlling action in response to the call; and
forwarding the data to the radio network operations system on the superior level,
wherein the at least one radio network operations system on a subordinate level comprises at least one access network.

2. The method according to claim 1, further comprising:
executing, at the radio network operations system on a superior level, the controlling action based on the retrieved data.

3. The method according to claim 1, further comprising:
retrieving data by the radio network operations system on the superior level from at least one of the radio network operations systems on the subordinate level, wherein the retrieving comprises:
exporting the retrieved data by the radio network operations system on the subordinate level; and
importing the data by the radio network operations system on the superior level; and
storing the imported data to data memory in the radio network operations system on the superior level.

4. The method according to claim 3, further comprising:
ascertaining whether the call for data demanded depending on the controlling action is to be forwarded to the radio network operations system on the subordinate level affected by the controlling action forwarding the call for data to the data memory when the call is not forwarded to the radio network operations system on the subordinate level;

providing the data in response to the call; and forwarding the data to the radio network operations system on the superior level.

5. The method according to claim 4, further comprising:

ascertaining whether the data demanded depending on the controlling action can be received from the radio network operations system on the subordinate level affected by the controlling action within a predetermined latency; and forwarding the call for data to the data memory when the data cannot be received within the predetermined latency.

6. The method according to claim 1, wherein the controlling action comprises at least one of monitoring and controlling a configuration of radio network elements and radio network resources.

7. The method according to claim 1, wherein the data comprises at least one of network element parameters and network resources parameters of the radio network on the subordinate level.

8. The method according to claim 1, wherein the data comprises topology data of the radio network on the subordinate level.

9. The method according to claim 1, wherein the radio network operations system on the subordinate level is an operations system for managing a regional radio network.

10. A system, comprising:

at least one radio network operations system on a subordinate level;

a radio network operations system on a superior level comprising an initiator configured to initiate a controlling action;

a call for generator, at the radio network operations system on the superior level, configured to generate a call for data depending on the controlling action;

a first interface between the radio network operations system on the subordinate level and the radio network operations system on the superior level configured to forward the call to at least one of the radio network operations systems on the subordinate level affected by the controlling action and to forward the data to the radio network operations system on the superior level; and a first provider comprising the radio network operations system on the subordinate level configured to provide data in response to the call, wherein the at least one radio network operations system on a subordinate level comprises at least one access network.

11. The system according to claim 10, further comprising:

an executor configured to execute the controlling action based on the retrieved data.

12. The system according to claim 10, further comprising:

a retriever at the radio network operations system on the superior level configured to retrieve the data from at least one of the radio network operations systems on the subordinate level;

an exporter at the radio network operations system on the subordinate level configured to export the retrieved data, an importer at the radio network operations system on the superior level configured to import the data; and data memory at the radio network operations system on the superior level configured to store the imported data.

13. The system according to claim 12, further comprising:

a first ascertainer at the radio network operations system on the superior level configured to ascertain whether the call for data is to be forwarded to the radio network operations system on the subordinate level affected by the controlling action;

a second provider at the radio network operations system on the superior level configured to provide the data stored in the data memory in response to the call; and a second interface at the radio network operations system on the superior level further configured to forward the call for data to the second provider when the call is not forwarded to the radio network operations system on the subordinate level.

14. The system according to claim 13, wherein the first interface and the second interface are uniform interfaces.

15. The system according to claim 13, further comprising:

a second ascertainer at the radio network operations system on the superior level configured to ascertain whether the data can be received from the radio network operations system on the subordinate level affected by the controlling action within a predetermined latency, the second interface further configured to forward the call for data to the second provider when the data cannot be received within a predetermined latency.

16. The system according to claim 10, further comprising:

a monitor configured to monitor a configuration of at least one of radio network elements and radio network resources; and a controller configured to control configuration of the at least one of radio network elements and radio network resources.

17. The system according to claim 13, wherein the call generator, the first interface, the second interface, the first provider, and the second provider are configured to generate and forward a call for at least one of network element parameters and network resource parameters and to forward and provide the at least one of network element parameters and network resource parameters.

18. The system according to claim 13, wherein the call generator, the first interface, the second interface, the first provider, and the second provider are configured to generate and forward a call for topology data and to forward and provide the topology data.

19. The system according to claim 18, wherein the first interface, the second interface, the first provider, and the second provider comprise a topology reader and a managed object reader.

20. The system according to claim 13, further comprising:

a second data memory, at the radio network operations system on the superior level, configured to store planned data;

a third provider, at the radio network operations system on the superior level, configured to provide the planned data; and a third interface configured to forward the call for data to the third provider.

21. The system according to claim 10, wherein the radio network operations system on a subordinate level is an operations system configured to manage a regional radio network.

22. An apparatus, comprising:

a first interface between a radio network operations system on a subordinate level and a radio network operations system on a superior level configured to forward a call for data which depends on a controlling action to at least one of the radio network operations systems on the subordinate level affected by the controlling action and to forward data to the radio network operations system on the superior level, wherein data is provided in response to the call for data, wherein the at least one radio network operations system on a subordinate level comprises at least one access network.

23. A method, comprising:

forwarding a call for data which depends on a controlling action, using a first interface between a radio network operations system on a subordinate level and a radio network operations system on a superior level, to at least one of the radio network operations systems on the subordinate level affected by the controlling action and to forward data to the radio network operations system on the superior level; and providing the data in response to the call for data, wherein the at least one radio network operations system on a subordinate level comprises at least one access network.

* * * * *